(12) United States Patent
Geib et al.

(10) Patent No.: US 8,655,571 B2
(45) Date of Patent: Feb. 18, 2014

(54) MFCC AND CELP TO DETECT TURBINE ENGINE FAULTS

(75) Inventors: Andrew F. Geib, Glastonbury, CT (US); Chung Chieh Kuo, Arcadia, CA (US); Martin Gawecki, Los Angeles, CA (US); EnShuo Tsau, Rowland Heights, CA (US); Je Won Kang, Wilmington, CA (US); Paul Raymond Scheid, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 265 days.

(21) Appl. No.: 13/167,519

(22) Filed: Jun. 23, 2011

(65) Prior Publication Data

US 2012/0330495 A1 Dec. 27, 2012

(51) Int. Cl.
*G01M 15/00* (2006.01)
*G06F 19/00* (2011.01)

(52) U.S. Cl.
USPC .............................. 701/100; 701/115; 702/56

(58) Field of Classification Search
USPC .............. 701/111, 115, 102, 33.4, 29.6, 32.9, 701/100; 702/56; 73/119 A, 1.82
See application file for complete search history.

(56) References Cited

U.S. PATENT DOCUMENTS

| | | | |
|---|---|---|---|
| 5,483,936 A * | 1/1996 | Kerstein et al. | 123/406.16 |
| 6,301,572 B1 | 10/2001 | Harrison | |
| 6,484,109 B1 | 11/2002 | Lofall | |
| 6,574,614 B1 * | 6/2003 | Kesel | 706/52 |
| 7,027,909 B2 | 4/2006 | deBotton et al. | |
| 7,027,953 B2 | 4/2006 | Klein | |
| 7,133,801 B2 | 11/2006 | Song | |
| 7,693,643 B2 * | 4/2010 | Kim et al. | 701/100 |
| 2006/0047403 A1 * | 3/2006 | Volponi et al. | 701/100 |
| 2012/0265534 A1 * | 10/2012 | Coorman et al. | 704/265 |

* cited by examiner

*Primary Examiner* — Tan Q Nguyen
(74) *Attorney, Agent, or Firm* — Kinney & Lange, P.A.

(57) ABSTRACT

A fault detection and diagnosis method for a gas turbine engines comprises collecting a sensor signal from an acoustic or vibrational sensor at the gas turbine engine, pre-processing the sensor signal to remove predictable background, and extracting a feature set from the sensor signal using Mel-Frequency Cepstral Coefficients (MFCC) algorithms and/or Code Excited Linear Prediction (CELP) algorithms. Fault and non-fault states are reported based on comparison between the feature set and a library of fault and non-fault feature profiles corresponding to fault and non-fault states of the gas turbine engine.

20 Claims, 3 Drawing Sheets

MFCC AND CELP TO DETECT TURBINE ENGINE FAULTS

BACKGROUND

The present invention relates generally to signal processing and analysis, and more particularly to detection and identification of gas turbine engine faults from acoustic or vibrational sensor data.

Aircraft turbine engines require regular maintenance. Even small defects in turbine components can cause malfunctions, and may pose a serious risk to aircraft safety. Proper scheduling and execution of maintenance therefore requires knowledge of even minor or incipient faults. Conventional diagnostic systems utilize a wide range of factors, including aircraft operational history, engine pressure and temperature analysis, and debris monitoring to predict and catch faults before major damage occurs. A continuing need exists for simpler, faster, and more accurate diagnostic systems which can recognize incipient turbine faults.

Gas turbine engine faults produce distinct variations in sound and vibration data, making acoustic and vibrational approaches attractive for fault identification and analysis. In practice, however, acoustic and vibrational analyses have been limited by high noise levels and complex, non-stationary signals.

Acoustic analysis has been used in testing and development of turbines to examine steady-state and ideal operational harmonics of individual components. Fault diagnosis is a far more complex task, involving non-stationary signals from multiple sources, obscured by high background noise. A variety of analytical approaches to vibrational and acoustic fault diagnosis have been attempted in the past, in both the time and frequency domains. These approaches, however, have lacked the accuracy to reliably distinguish fault signatures from background noise. Other techniques using wavelet transform or neural networks have recently been attempted with limited success, but fault detection and identification using acoustic and vibrational analyses remains an open problem.

SUMMARY

The present invention is directed toward a system and method for fault detection and diagnosis for a gas turbine engine. A sensor signal is collected from an acoustic and/or vibrational sensor at the gas turbine engine, and pre-processed to remove predictable background. Algorithms using Mel-Frequency Cepstral Coefficients (MFCC) and/or Code Excited Linear Prediction (CELP) are used to extract a feature set from the pre-processed sensor signal, and fault and non-fault states are reported based on comparison between the feature set and a library of fault and non-fault feature profiles corresponding to fault and non-fault states of the gas turbine engine.

DETAILED DESCRIPTION

Figure 1:
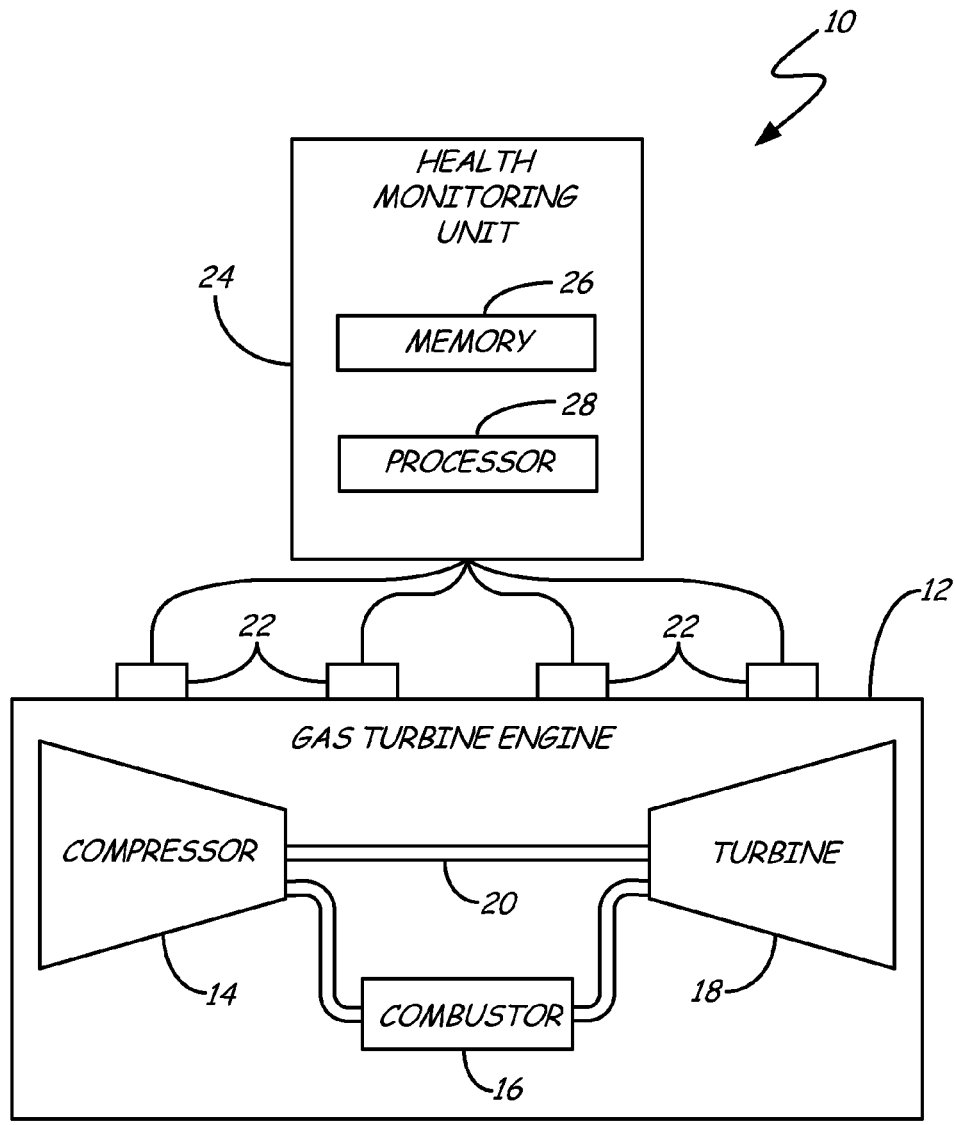
FIG. 1 is a block diagram of the fault diagnostic system of the present invention.

FIG. 1 depicts fault diagnostic system 10 for gas turbine engine 12. Gas turbine 12 comprises compressor 14, combustor 16, turbine 18, and shaft 20. Fault diagnostic system 10 comprises sensors 22 and health monitoring unit 24 with memory 26 and processor 28. Gas turbine engine 12 is an aircraft gas turbine engine which compresses environmental air at compressor 14, injects fuel into this compressed air and combusts the resulting fuel-air mixture at combustor 16, and extracts energy from high-pressure gas flow at turbine 18. Compressor 14 and turbine 18 share shaft 20, by which turbine 18 is capable of driving compressor 14. Although only one compressor 14, shaft 20, and turbine 18 are shown, some embodiments of gas turbine engine 12 include multiple turbine and compressor stages with separate shafts.

Sensors 22 are attached to gas turbine engine at fixed locations. Sensors 22 include a plurality of accelerometer vibration sensors, a plurality of acoustic pressure sensors, or both. Sensors 22 may be integrated into a housing of gas turbine engine 12, or may be removable sensors which are placed on or near gas turbine engine 12 during maintenance. Sensors 22 provide vibration and/or acoustic readings to health monitoring unit 24. Health monitoring system 24 is a logic-capable device which processes data from multiple systems to produce a health assessment of turbine 12. In addition to the acoustic fault diagnostics disclosed herein, health monitoring system 24 may utilize a plurality of methods and receive a plurality of sensor inputs relating to the health and operation of gas turbine 12, including heat, pressure, and debris sensor data Like sensors 22, health monitoring unit 24 may be located on board the aircraft of gas turbine engine 12, or may be a separate ground unit used during maintenance. Health monitoring system 24 analyzes vibrational and acoustic data from sensors 22 to detect and diagnose faults in gas turbine engine 12. Health monitoring system 24 comprises memory 26 and processor 28. Memory 26 is a data storage medium for storing a library of feature profiles of known fault and non-fault conditions, as described with respect to FIG. 2. Processor 28 is a signal and logic processing component such as a microprocessor. Processor 28 extracts a plurality of features from sensor signals using Mel-Frequency Cepstral Coefficients (MFCC) and Code Excited Linear Prediction (CELP), and detects and diagnoses faults by comparing these features to the feature profiles stored in memory 26.

Acoustic signal processing using MFCC has been highly successful in modeling human speech, but has not previously been applied to turbine diagnostics. The MFCC approach divides a frequency-domain signal into several frequency bands, conventionally of variable width corresponding to ranges heard by the human ear. The signal is then characterized as a sequence of total energy values from each bin.

CELP has primarily been used for audio signal compression in telecommunications, but can also be used to extract representative features from audio or vibrational signals. The CELP approach approximates an audio signal as an N-dimensional best-fit polynomial about a base pitch. The base pitch and the coefficients of this polynomial are extracted as N+1 features which characterize the signal.

Processor 28 applies MFCC and CELP algorithms to extract a plurality of features from acoustic and vibrational signals provided by sensors 22. Unlike conventional approaches, this feature extraction method requires no knowledge of engine speed. Features are compared with feature profiles stored in a library in memory 26 to determine whether gas turbine engine 12 is behaving as expected, or experiencing one or more fault conditions. If the features extracted by processor 28 do not match non-fault feature profile from memory 26, processor 28 diagnoses a fault by comparing the sensor signals with fault feature profiles from memory 26.

Figure 2:
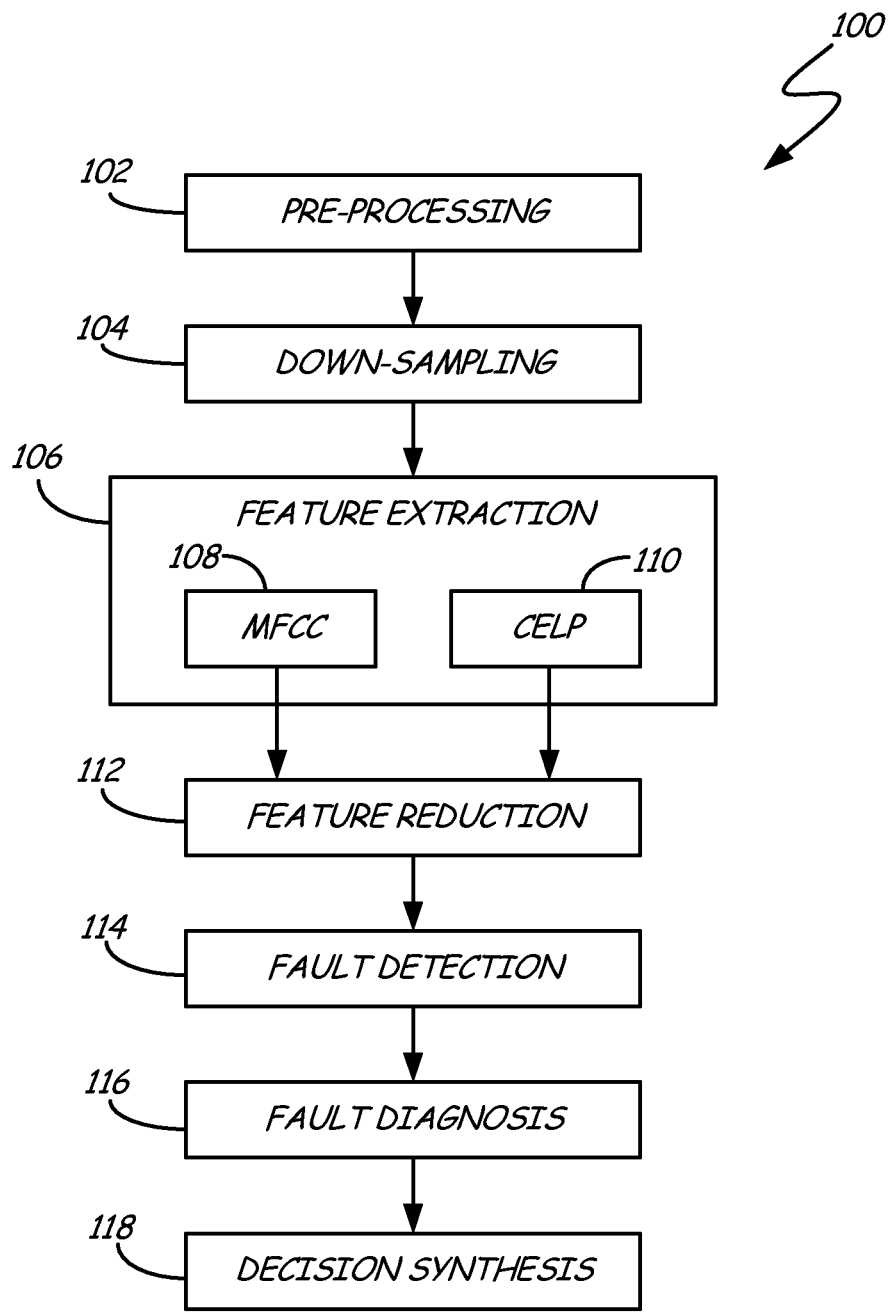
FIG. 2 is a method flowchart of a signal processing and analysis method of the fault diagnostic system of FIG. 1.

FIG. 2 depicts signal processing and analysis method 100, which detects and diagnoses faults based on signals from sensors 22. First, a signal is collected from each sensor 22, and conventional pre-processing methods are used to remove noise irrelevant data due to known acoustic or vibrational background conditions, or due to sensor imperfections. (Step 102). Pre-processing only removes noise due to specific, known background characteristics, and does not generally smooth or simplify sensor signals.

In the depicted embodiment, health monitoring unit 24 down-samples the pre-processed sensor signal to reduce data volume to a desired sampling rate. (Step 104). Down-sampling is necessary only where an overabundance of data is collected due to a large number or high sampling rate of sensors 22. Down-sampling is not necessary where processing speeds of data processor 28 match or exceed sampling speeds. To preserve data volume and thereby diagnostic accuracy, a sampling ratio (collection rate:sampling rate) is chosen which discards no more data than necessary due to hardware limitations of health monitoring unit 24. Down-sampling may be accomplished via conventional methods, such that down-sampled signals have a sampling rate suitable to processor 28 (e.g. 3 kHz for most aircraft health monitoring units).

The results of down-sampling (or of pre-processing, if no down-sampling is performed) are analyzed to extract a signal feature set which characterizes sensor signals from sensors 22. (Step 106). As depicted, feature extraction includes both MFCC (Step 108) and CELP (Step 110) signal analysis. In alternative embodiments, however, only one or the other of MFCC or CELP analyses are used. Using MFCC, signal energies are measured in a plurality of mel-scale frequency banks across a series of frequency ranges. These energies are designated as MFCC signal features. Using CELP, the sensor signal is approximated as a best-fit N-dimensional polynomial about a base pitch. This base pitch, and the N coefficients of the best-fit polynomial, form N+1 CELP features. Feature extraction step 106 is discussed in greater detail with respect to FIG. 3.

Features extracted using MFCC, CELP, or both are concatenated and, if necessary, reduced. (Step 112). Like down-sampling (Step 104), feature reduction may not always be performed, but can be necessitated by hardware limitations of health monitoring unit 24. In particular, feature reduction is performed to improve the speed of fault detection (Step 114) and diagnosis (Step 116), which are described in further detail below. Conventional pattern recognition techniques such as Principal Component Analysis (PCA) or Independent Component Analysis (ICA) are used to produce a concise linear combination of the original feature set produced during feature extraction step 106.

The signal features set extracted using MFCC and CELP (and reduced, if necessary) is analyzed to detect (Step 114) and diagnose (Step 116) faults. Processor 28 compares the signal feature set to feature profiles from memory 26 corresponding to known fault and non-fault states of gas turbine engine 12. These feature profiles are sets of catalogued signal features or signal feature ranges produced by training health monitoring unit 24, as described below. Each fault feature profile is associated with a corresponding fault, such as a damaged blade, pitted bearing, or misaligned shaft. If the signal feature set matches a non-fault feature profile from memory 26, no fault is reported. If the signal feature set does not match any non-fault feature profiles, however, processor 28 reports a fault detection and attempts to provide a fault diagnosis by classifying the signal features according to catalogued fault feature profiles. If processor 28 finds a fault feature profile in memory 26 which matches the signal features, processor 28 diagnoses a fault of the appropriate type (e.g. a damaged second-stage compressor blade) corresponding to that fault feature profile. A variety of conventional pattern classification and machine learning techniques may be used to classify fault signals extracted with MFCC and CELP, including the K-nearest neighbors (KNN) algorithm, Gaussian mixture models (GMM), and support vector machines (SVM). In general, any applicable signal classification method may be used, within the hardware limitations of health monitoring unit 24. Some sets of signal features may not match any catalogued feature profile, in which case health monitoring unit 24 reports a diagnostic failure. In other cases, signal feature sets may correspond to multiple superimposed failure states from memory 26, in which case health monitoring unit 24 reports either a single combined fault diagnosis, or a plurality of separate, overlapping fault diagnoses.

In some embodiments of the present invention, signal processing and analysis method 100 ends with fault diagnosis (Step 116), and feature profile matches are reported directly to a maintenance scheduler, or stored in a log. In other embodiments, diagnoses performed in step 116 may require synthesis. Synthesis is likely to be necessary where fault diagnostic system 10 includes a large number of sensors 22, or where data sampling rates are moderate-to-high. Health monitoring unit 26 therefore aggregates the results of Step 116, for instance by recording or reporting a median fault diagnosis across multiple sensors or multiple time windows. (Step. 118). Recorded or reported fault diagnoses are used to schedule maintenance for gas turbine engine 12, and may be forwarded to a separate maintenance scheduling system (not shown).

Signal processing and analysis method 100 is also used, with only minor alterations, during a teaching mode of health monitoring unit 24. In order to build the feature profile library stored in memory 26, fault diagnostic system 10 runs in a teaching mode wherein fault classification results are independently known. In this mode, health monitoring unit 24 performs pre-processing, down-sampling, feature extraction, and feature reduction as during ordinary diagnostic operation. Upon identifying a signal feature set, health monitoring unit 24 associates the signal feature set with the known fault classification, rather than attempting to diagnose a fault from the signal feature set. Fault and non-fault feature profiles are constructed and loaded into memory 26 using algorithms analogous to those utilized in fault detection and diagnosis steps 114 and 116. Memory 26 can be updated according to training performed in other fault diagnostic systems 10.

Signal processing and analysis method 100 provides rapid, accurate fault diagnosis from acoustic or vibrational data using MFCC algorithms, CELP algorithms, or both. In addition, health monitoring unit 24 is capable of learning new fault diagnoses in the field, as described above.

Figure 3:
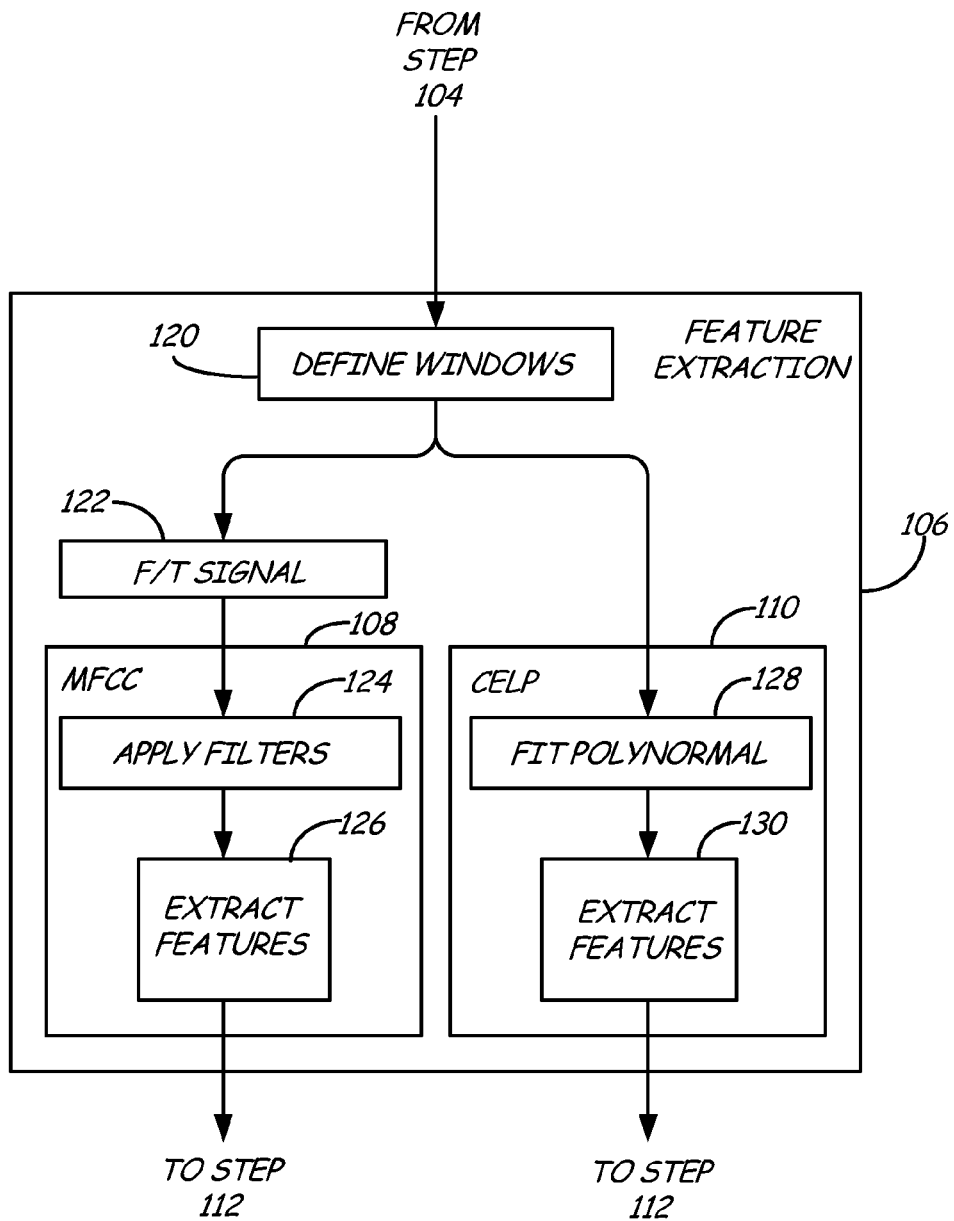
FIG. 3 is an expanded method flowchart of a feature extraction step of the signal processing and analysis method of FIG. 2.

FIG. 3 is an expanded flowchart of step 106, introduced above with respect to FIG. 2. Upon receiving a sensor signal (which may be down-sampled, as described above) from sensor 22, health monitoring unit 28 divides the sensor signal into a plurality of time-domain windows (Step 120), and Fourier-transforms each window (Step 122). The Fourier-transformed signals within each window are analyzed using MFCC (Step 108), while the untransformed signals within each window are analyzed using CELP (Step 110).

Sensor signals can be windowed using a variety of filter techniques. A sensor signal can, for instance, be divided into a plurality of finer resolution windows using a series of consecutive rectangular time windows. Alternatively, signals can be windowed using functions which assign variable weights to signals within consecutive ranges, such as Hamming or Hanning functions, so as to minimize high frequency noise when Fourier transformed.

MFCC analysis (Step 108) begins by designating a series of M consecutive mel-scale frequency banks collectively spanning the frequency-domain sensor signal at each time window. (Step 124) These frequency banks are produced by a collection of M filters (e.g. overlapping triangular filters spanning consecutive frequency ranges) from a filter bank stored in memory 26, which are applied to the frequency-domain sensor signal. M may, for instance, be 21. As noted above, MFCC techniques are most frequently used for sounds audible to the human ear. Accordingly, MFCC techniques conventionally use frequency banks of width which increases with frequency. Similar frequency banks can be used in the present invention, although frequency banks of fixed width can also be used. Health monitoring unit 24 calculates the energy of frequency-domain sensor signal under each filter. (Step 126). These M energy values are designated the MFCC features of the windowed sensor signal.

CELP analysis (Step 110) begins by fitting each window of the time-domain sensor signal to an N-dimensional best-fit polynomial at a fixed pitch. (Step 128). N may, for instance, be 10. The pitch and the N polynomial coefficients of this best-fit polynomial (Linear Prediction Coefficients, or LPCs) are designated as the CELP features of the windowed sensor signal. (Step 130).

As described above with respect to FIG. 2, the MFCC and CELP features of each windowed sensor signal are concatenated and analyzed to detect and diagnose faults (Steps 114 and 116). A combined X-dimensional feature set is produced at each time window, for each sensor, where X=M MFCC features+N CELP coefficients+1 pitch. The resulting data volume may be large, necessitating feature reduction, as described above. (Step 112).

As described above, signal processing and analysis method 100 utilizes MFCC and CELP analyses to detect and identify faults in gas turbine engine 12, enabling quick and accurate diagnostics. Fault diagnostic system 10 thus enables earlier detection of fault conditions, improving safety and reducing maintenance times and costs. In addition, health monitoring unit 24 is capable of learning new fault condition, and thereby improving the accuracy of fault diagnostic system 10 over time.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fault detection and diagnosis system for a gas turbine engine, the system comprising:
   a sensor positioned on the gas turbine engine; and
   a health monitoring unit which receives and processes a sensor signal from the sensor, the health monitoring unit comprising:
   a digital storage medium containing a library of fault and non-fault feature profiles mapping fault states and non-fault states of the gas turbine engine, respectively, to combinations of Mel-Frequency Cepstral Coefficient (MFCC) frequency bank energies and/or Code Excited Linear Prediction (CELP) polynomial coefficients; and
   a processor which extracts a feature set from the sensor signal using at least one of MFCC algorithms and CELP algorithms, and detects and diagnoses faults in the gas turbine engine by matching the feature set to one or more of the fault or non-fault feature profiles.

2. The fault detection system of claim 1, wherein the processor extracts the feature set from the sensor signal using both MFCC and CELP algorithms.

3. The fault detection system of claim 2, wherein a first subset of features is extracted from the sensor signal using MFCC algorithms, a second subset of features is extracted from the sensor signal using CELP algorithms, and the first and second subsets of features are concatenated to form the feature set.

4. The fault detection system of claim 1, wherein the sensor comprises an acoustic pressure sensor.

5. The fault detection system of claim 1, wherein the sensor comprises a vibrational accelerometer.

6. The fault detection system of claim 1, wherein a plurality of sensors are positioned on the gas turbine engine, all of which produce sensor signals which are received and processed by the health monitoring unit using MFCC and CELP algorithms.

7. The fault detection system of claim 6, wherein the plurality of sensors comprises both acoustic pressure sensors and vibrational accelerometers.

8. A fault detection and diagnosis method for a gas turbine engine, the method comprising:
   collecting a sensor signal from an acoustic or vibrational sensor at the gas turbine engine;
   pre-processing the sensor signal to remove predictable background;
   extracting a feature set from the sensor signal using Mel-Frequency Cepstral Coefficients (MFCC) algorithms and Code Excited Linear Prediction (CELP) algorithms;
   comparing the feature set to a library of fault and non-fault feature profiles that map fault and non-fault states of the gas turbine engine to combinations of MFCC frequency bank energies and/or CELP polynomial coefficients; and
   reporting fault and non-fault states of the gas turbine engine based on comparison between the feature set and the feature profiles.

9. The fault detection and diagnosis method of claim 8, wherein comparing the feature set to a library of fault and non-fault feature profiles comprises:
   identifying a non-fault state if the feature set matches any non-fault feature profile; and
   identifying a fault state if the feature set matches the corresponding a fault feature profile.

10. The fault detection and diagnosis method of claim 8, further comprising:
    scheduling maintenance for the gas turbine engine based on the diagnosed fault state or the reported non-fault state.

11. The fault detection and diagnosis method of claim 8, wherein extracting the feature set requires no knowledge of engine speed.

12. The fault detection and diagnosis method of claim 8, wherein extracting the feature set comprises:
    Fourier-transforming the sensor signal;
    applying a series of M mel-scale filter functions to the Fourier-transformed sensor signal to produce a series of M frequency banks; and designating the energy within each frequency bank as a feature in the feature set.

13. The fault detection and diagnosis method of claim 12, wherein the mel-scale filter functions are overlapping triangular filter functions.

14. The fault detection and diagnosis method of claim 8, wherein extracting the feature set comprises:
fitting the sensor signal to an N-dimensional CELP polynomial; and
designating the pitch and the coefficients of the N-dimensional CELP polynomial as features of the feature set.

15. The fault detection and diagnosis method of claim 8, further comprising:
reducing the feature set before comparing the feature set to a library of fault and non-fault profiles.

16. The fault detection and diagnosis method of claim 8, further comprising:
down-sampling the sensor signal before extracting the feature set, so as to produce a desired number of samples per second.

17. The fault detection and diagnosis method of claim 8, wherein extracting the feature set from the sensor signal comprises extracting M MFCC features, N CELP coefficients, and 1 pitch from each sample to form an X-dimensional feature set for each sample, with X=M+N+1.

18. The fault detection and diagnosis method of claim 8, further comprising:
aggregating a plurality of results from comparing feature sets to the library of faults and non-fault profiles, to produce a synthesized fault diagnosis.

19. The fault detection and diagnosis method of claim 8, wherein the fault and non-fault feature profiles map characteristics of feature sets onto states of the gas turbine engine.

20. The fault detection and diagnosis method of claim 19, wherein the fault and non-fault feature profiles are produced by extracting a feature set from a sensor signals corresponding to known fault and non-fault conditions.

* * * * *